United States Patent
Scott et al.

(10) Patent No.: US 12,452,165 B2
(45) Date of Patent: Oct. 21, 2025

(54) ASYNCHRONOUS DATA TRANSMISSION OVER AVIONICS COMMUNICATION NETWORK

(71) Applicant: The Boeing Company, Arlington, VA (US)

(72) Inventors: James P. Scott, Manhattan Beach, CA (US); Douglas W. Meyer, Jr., Friendswood, TX (US); Richard A. Noyola, Redondo Beach, CA (US); Eric J. Miller, Los Angeles, CA (US); Arun Ayyagari, Seattle, WA (US)

(73) Assignee: The Boeing Company, Arlington, VA (US)

( * ) Notice: Subject to any disclaimer, the term of this patent is extended or adjusted under 35 U.S.C. 154(b) by 277 days.

(21) Appl. No.: 18/163,181

(22) Filed: Feb. 1, 2023

(65) Prior Publication Data
US 2024/0259296 A1    Aug. 1, 2024

(51) Int. Cl.
*H04L 45/00* (2022.01)
*H04L 45/121* (2022.01)
*H04L 45/24* (2022.01)
*H04L 47/215* (2022.01)
*H04L 67/12* (2022.01)

(52) U.S. Cl.
CPC ............ *H04L 45/24* (2013.01); *H04L 45/121* (2013.01); *H04L 47/215* (2013.01); *H04L 67/12* (2013.01)

(58) Field of Classification Search
CPC ..... H04L 45/24; H04L 45/121; H04L 47/215; H04L 67/12
See application file for complete search history.

(56) References Cited

U.S. PATENT DOCUMENTS

| 2009/0073984 A1* | 3/2009 | Jackson | H04L 41/0803 725/37 |
| 2021/0073689 A1 | 3/2021 | Finzi et al. | |

FOREIGN PATENT DOCUMENTS

| EP | 3076596 A1 * | 10/2016 | ........ H04L 41/0869 |
| EP | 3812875 A1 * | 4/2021 | ............ B64D 45/00 |
| WO | WO-9815088 A1 * | 4/1998 | ........... G05D 1/0077 |

OTHER PUBLICATIONS

Demers, A. et al., "Analysis and Simulation of a Fair Queueing Algorithm," Proceedings SIGCOMM ë89, CCR vol. 19, No. 4, Sep. 1989, Austin, TX, 12 pages.
Heinanen, J. et al., "A Single Rate Three Color Marker" Network Working Group, Sep. 1999, 6 pages.
(Continued)

*Primary Examiner* — Cheikh T Ndiaye
(74) *Attorney, Agent, or Firm* — Alleman Hall & Tuttle LLP

(57) ABSTRACT

An avionics data communication network includes a computing device configured to asynchronously transmit data packets in parallel via three or more redundant network interface controllers (NICs). The data packets offered to the avionics data communication network are bound using a token bucket filter (TBF). Three or more redundant network switches are configured to receive and relay the data packets from a different NIC of the three or more redundant NICs of the computing device. An avionics device is configured to receive the data packets from the computing device within a deterministic end-to-end transmission delay bound, the avionics device receiving the data packets via at least one of the three or more redundant network switches.

20 Claims, 8 Drawing Sheets

(56) References Cited

OTHER PUBLICATIONS

Heinanen, J. et al., "A Two Rate Three Color Marker," Network Working Group, Sep. 1999, 5 pages.
"Industrial communication networks—High availability automation networks—Part 3: Parallel Redundancy Protocol (PRP) and High-availability Seamless Redundancy (HSR)," International Electrotechnical Commission (IEC), Dec. 2021, 498 pages.
IEEE Computer Society, "IEEE Standard for Ethernet," IEEE Standards Association, Dec. 28, 2012, 634 pages.
IEEE Computer Society, "IEEE Standard for Local and metropolitan area networks—Bridges and Bridged Networks," IEEE Standards Association, Nov. 3, 2014, 1832 pages.
The Metro Ethernet Forum (MEF), "Generic Token Bucket Algorithm," Technical Specification, Oct. 2013, 17 pages.
Perekh, A, "A Generalized Processor Sharing Approach to Flow Control in Integrated Services Networks," Dissertation In partial fulfillment of the requirements for the degree of Doctor of Philosophy, Massachusetts Institute of Technology, Feb. 1992, 165 pages.

\* cited by examiner ns ASYNCHRONOUS DATA TRANSMISSION
OVER AVIONICS COMMUNICATION
NETWORK

FIELD

The invention relates generally to systems for facilitating asynchronous data transmission between entities of an avionics data communication network.

BACKGROUND

Electronic devices are in some cases configured to communicate with one another by transmitting data over a communication network. Some network environments have strict requirements as to the maximum transmission delay bound between a data source and data destination, and satisfying such requirements often introduces significant complexity to the network design. As one non-limiting example, avionics data networks implemented by networked components of an aerial vehicle often require strict maximum delay bounds.

SUMMARY

This summary is not an extensive overview of the specification. It is intended to neither identify key or critical elements of the specification nor delineate any scope particular to embodiments of the specification, or any scope of the claims. Its sole purpose is to present some concepts of the specification in a simplified form as a prelude to the more detailed description that is presented in this disclosure.

To address at least the above issues, according to one aspect of the subject disclosure, an avionics data communication network includes a computing device configured to asynchronously transmit data packets in parallel via three or more redundant network interface controllers (NICs). The data packets offered to the avionics data communication network are bound using a token bucket filter (TBF). Three or more redundant network switches are configured to receive and relay the data packets from a different NIC of the three or more redundant NICs of the computing device. An avionics device is configured to receive the data packets from the computing device within a deterministic end-to-end transmission delay bound, the avionics device receiving the data packets via at least one of the three or more redundant network switches.

The features, functions, and advantages that have been discussed can be achieved independently in various embodiments or can be combined in yet other embodiments, further details of which can be seen with reference to the following description and drawings.

DETAILED DESCRIPTION

Some network environments have strict requirements as to the maximum transmission delay bound for data transmitted by a source device to a destination device. For instance, data networks of aerial vehicles (such as avionics control networks) are often required to provide high availability and satisfy deterministic end-to-end transmission delay bounds. It can be difficult to meet these requirements without introducing significant added complexity to the network design—e.g., some solutions adapt an ethernet communications network to use synchronous network transmission to achieve determinism.

As such, the present disclosure is directed to techniques for facilitating asynchronous data communication between devices of a data communication network. In some examples, the data communication network is an avionics data communication network of an aerial vehicle. Generally, a computing device transmits data packets in parallel via three or more redundant network interface controllers (NICs). The data packets offered to the network are bound using a token bucket filter (TBF) implemented by the computing device—e.g., the TBF is used to control a peak information rate, peak burst size, committed information rate, and committed burst size of the data packets. The data packets are received and relayed by three or more redundant network switches, each receiving data packets from a different NIC of the computing device. In some examples, the computing device and network switches each regulate transmission of the data packets using prioritized fair share schedulers. The data packets are then received at a destination device (e.g., an avionics device of an aerial vehicle) via at least one of the redundant network switches, such that the transmission time between the computing device and destination device satisfies a deterministic end-to-end transmission delay bound through the use of a priority fair scheduler at intermediate processing nodes in the network.

In this manner, the techniques described herein beneficially enable asynchronous data transmission in a manner that provides high availability, mitigates the impact of single event effects (SEEs), and satisfies deterministic end-to-end transmission delay bounds.

The present disclosure primarily describes transmission of data packets over a data communication network. However, it will be understood that the techniques described herein could additionally or alternatively be applied to data frames, and that "packets" and "frames" are used synonymously herein to refer to general units of data transmitted from one device to another. For the purposes of the present disclosure, a "data packet" or "data frame" can have any suitable fixed or variable size depending on the implementation.

Figure 1:
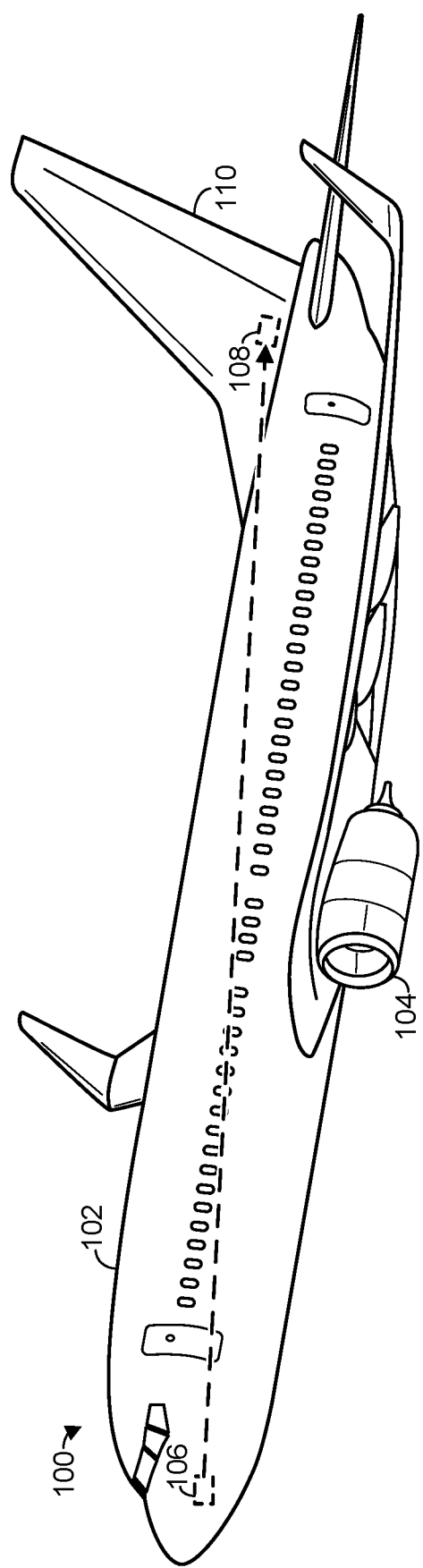
FIG. 1 schematically illustrates network communication between components of an example aerial vehicle.

FIG. 1 schematically shows an example aerial vehicle 100. Specifically, aerial vehicle 100 takes the form of an airplane having a vehicle frame 102 and propulsion system 104. It will be understood that the specific appearance of aerial vehicle 100 is non-limiting. The present disclosure primarily focuses on data transmission in avionics data communication networks, implemented aboard aerial vehicles such as vehicle 100. However, it will be understood that the techniques described herein may be implemented in any suitable aerial vehicle, including airplanes, rotorcrafts, powered gliders, and unmanned aerial vehicles (UAVs), as examples. Additionally, or alternatively, the techniques described herein may be implemented in vehicles other than aerial vehicles, such as aquatic vehicles (e.g., boats, ships, barges, submersible vehicles), terrestrial vehicles (e.g., cars, trucks, carts, motorcycles, robots), or extra-atmospheric vehicles (e.g., satellites, space stations, orbital vehicles, deep space vehicles). Furthermore, it will be understood that the techniques described herein may in some cases be implemented in general computer networks—e.g., not integrated into any sort of vehicle.

Aerial vehicle 100 additionally includes a computing device 106 configured to transmit data to an avionics device 108. It will be understood that the positions of computing device 106 and avionics device 108 relative to aerial vehicle 100 are non-limiting and should not be construed as corresponding to any specific devices or components onboard any specific aircraft. In this example, avionics device 108 controls a control surface 110 of the aerial vehicle to thereby influence movement of the aerial vehicle, based at least in part on the data transmitted by computing device 106. For instance, both computing system 106 and avionics device 108 may be components used to implement an electronic fly-by-wire system. In this example, the control surface is a rudder, although this is non-limiting. Additional non-limiting examples of control surfaces of an aerial vehicle include flaps, ailerons, stabilizers, elevators, tabs, slats, etc. Furthermore, in some examples, the avionics device controls vehicle systems in addition to, or instead of, control surfaces—e.g., landing gear or power plant systems.

It will be understood that the data transmitted by the computing device takes any suitable form, and is used for any suitable purpose. As will be described in more detail below, in some cases two different communications networks having similar or identical physical configurations are used for two different types of data—e.g., one network is used for C4 (command, control, communications, and computers) data, while another network is used for ISR (intelligence, surveillance, and reconnaissance) data. As non-limiting examples, the transmitted data can include navigation data (e.g., inertial reference unit guidance, GPS data), monitoring data (e.g., flap status, aileron status, hydraulics data, landing gear status), flight recorder data, weather data, vehicle control data (e.g., for controlling one or more control surfaces of a vehicle), data communicated to a human crew, data communicated to an external entity (e.g., aircraft control), and/or any other suitable data. It will be understood that the present disclosure is agnostic as to the specific type of data transmitted over a data communication network, but rather is directed to techniques for transmitting such data asynchronously while providing high availability and satisfying deterministic transmission delay bounds.

Figure 2:
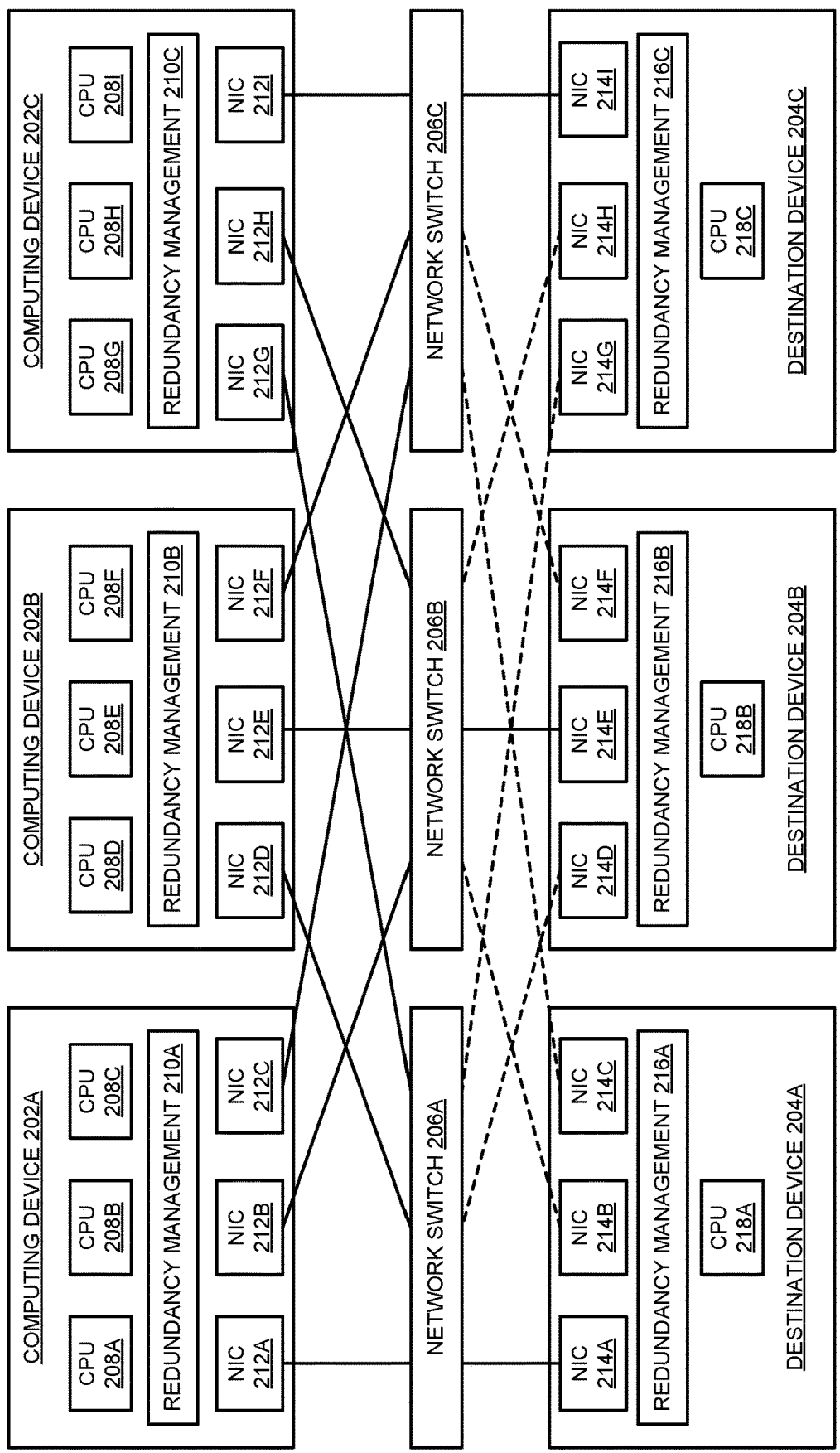
FIG. 2 schematically shows an example data communication network.

In the simplified example of FIG. 1, one computing device is transmitting data to one destination device. However, it will be understood that a data communication network implementing the techniques described herein has any suitable number of network nodes transmitting to and/or receiving data from any suitable number of other nodes. To this end, FIG. 2 schematically shows an example data communication network 200, which includes three computing devices 202A, 202B, and 202C. The computing devices are each configured to transmit data packets to destination devices 204A, 204B, and 204C, the data packets relayed by network switches 206A, 206B, and/or 206C. As one non-limiting example, the destination devices are avionics devices—e.g., any suitable electronic devices of an aerial vehicle that receive and/or transmit avionics data (such as communications, navigation, monitoring, fuel, flight recorder, weather, or flight control data, as examples). It will be understood that the configuration depicted in FIG. 2 is non-limiting and highly simplified for the sake of explanation.

Physical nodes of a data communication network each have any suitable capabilities, hardware configurations, and form factors. In various examples, a "computing device," "destination device," "avionics device," "ISR computing device," "ISR receiving device," and/or any other electronic device(s) described herein are implemented as computing system 700 described below with respect to FIG. 7. Furthermore, it will be understood that each of computing devices 202A-202C need not have the same capabilities, hardware configurations, or form factors. Rather, in some examples, the computing devices have different respective roles within the network (e.g., different devices on-board an aerial vehicle), and therefore have different hardware configurations suitable to those roles, provided they are still capable of transmitting and/or receiving data packets as described herein. Similarly, in some examples, the destination devices 204A-C do not have the same capabilities, hardware configurations, or form factors as one another.

The present disclosure primarily focuses on transmission of data from a "computing device" to a "destination device," such as an avionics device or ISR receiving device. However, it will be understood that, in some examples, the destination devices are themselves configured to transmit data over the communication network—e.g., for delivery to the computing devices. In other words, in the example of FIG. 2, devices 202A-C are serving as source devices and transmitting data to destination devices 204A-C. However, in some examples, devices 204A-C themselves serve as source devices and transmit data to computing devices 202A-C.

The various network nodes in network 200 are communicatively coupled in any suitable way. In some examples, the computing devices, network switches, and destination devices are communicatively coupled via asynchronous ethernet, which beneficially provides for a simpler network design than scenarios where ethernet is adapted to transmit data synchronously.

The configuration depicted in FIG. 2 provides triple-string redundancy for data transmission. Although the present disclosure primarily focuses on such triple-string scenarios, it will be understood that this is non-limiting. Rather, a data communication network as described herein provides N-string redundancy, where N is any suitable positive integer greater than one. Use of odd values for N beneficially enables transmission faults to be detected via majority voting. For instance, in a triple-string redundancy scenario, if two data packets are identical and differ from a third data packet, it is likely that the third data packet was affected by a transmission fault—e.g., caused by a high-energy charged particle interacting with device logic.

In the example of FIG. 2, each computing device 202A-202C includes three respective central processing units (CPUs), each generating data packets for transmission over network 200—e.g., computing device 202A includes CPUs 208A-C, computing device 202B includes CPUs 208D-F, and computing device 202C includes CPUs 208G-I. Thus, in this example, each computing device generates three identical data packets for transmission. Each computing device additionally includes respective redundancy management logic—e.g., computing devices 202A-C respectively include redundancy management logic 210A-C. Furthermore, each computing device includes three different redundant network interface controllers (NICs)—e.g., computing device 202A includes NICs 212A-C, computing device 202B includes NICs 212D-F, and computing device 202C includes NICs 212G-I. Each computing device asynchronously transmits its data packets in parallel via the three or more redundant NICs of the computing device.

In some examples, the redundancy management logic and redundant NICs are configured to implement PRP (parallel redundancy protocol), with modifications made to the PRP redundancy layer to enable tri-cast transmission. In other words, each of the data packets generated by the computing device are independently transmitted by the NICs to different network planes corresponding to the three redundant network switches. Furthermore, in some cases, a Gray code is used to encode the identifiers for each of the three network planes. Because adjacent values in Gray code space differ by no more than a single bit (e.g., a reflected binary code), then use of Gray codes beneficially facilitates detection of transmission faults. In some examples, each computing device includes suitable voting logic (e.g., to implement N-modular redundancy and detect data faults), and/or MUX/DEMUX (multiplexing/demultiplexing) for multiplexing outgoing data, and/or demultiplexing incoming data.

Network 200 includes three redundant network switches 206A-C, each configured to receive and relay the data packets from a different NIC of each computing device. In other words, as is shown in FIG. 2, network switch 206A receives and relays data packets from NIC 212A of computing device 202A, NIC 212D of computing device 202B, and NIC 212G of computing device 202C. Network switches 206B and 206C similarly receive data packets from different respective NICs of computing devices 202A-202C.

The data packets relayed by the three redundant network switches are received at destination devices 204A-204C, such that each destination device receives data packets via at least one of the three or more redundant network switches. The data packets are received via respective NICs of each destination device—e.g., destination device 204A includes NICs 214A-C, destination device 204B includes NICs 214D-F, and destination device 204C includes NICs 214G-I.

In some examples, each destination device receives the data packets in parallel from each of the three or more redundant network switches—e.g., destination device 204A receives data packets relayed by each of the three redundant network switches 206A-C. To this end, each destination device includes respective redundancy management logic 216A-C. As discussed above, in some cases the redundancy management logic is configured to implement PRP and verify that incoming data packets are identical before passing them along to a destination address. In cases where the destination devices receive data packets in parallel via each of the three network switches, each destination device also includes a respective CPU 218A-C. Similar to the computing devices, each destination device in some cases includes suitable voting logic and/or MUX/DEMUX.

In other examples, each destination device receives data packets from only a single network switch of the three redundant network switches. This is indicated in FIG. 2 by the dashed lines shown for some of the connections between the network switches and destination device, indicating that such connections are optional. In cases where a destination device only receives data packets from one network switch, then the destination device may optionally omit a CPU and at least some redundancy management logic.

Figure 3A:
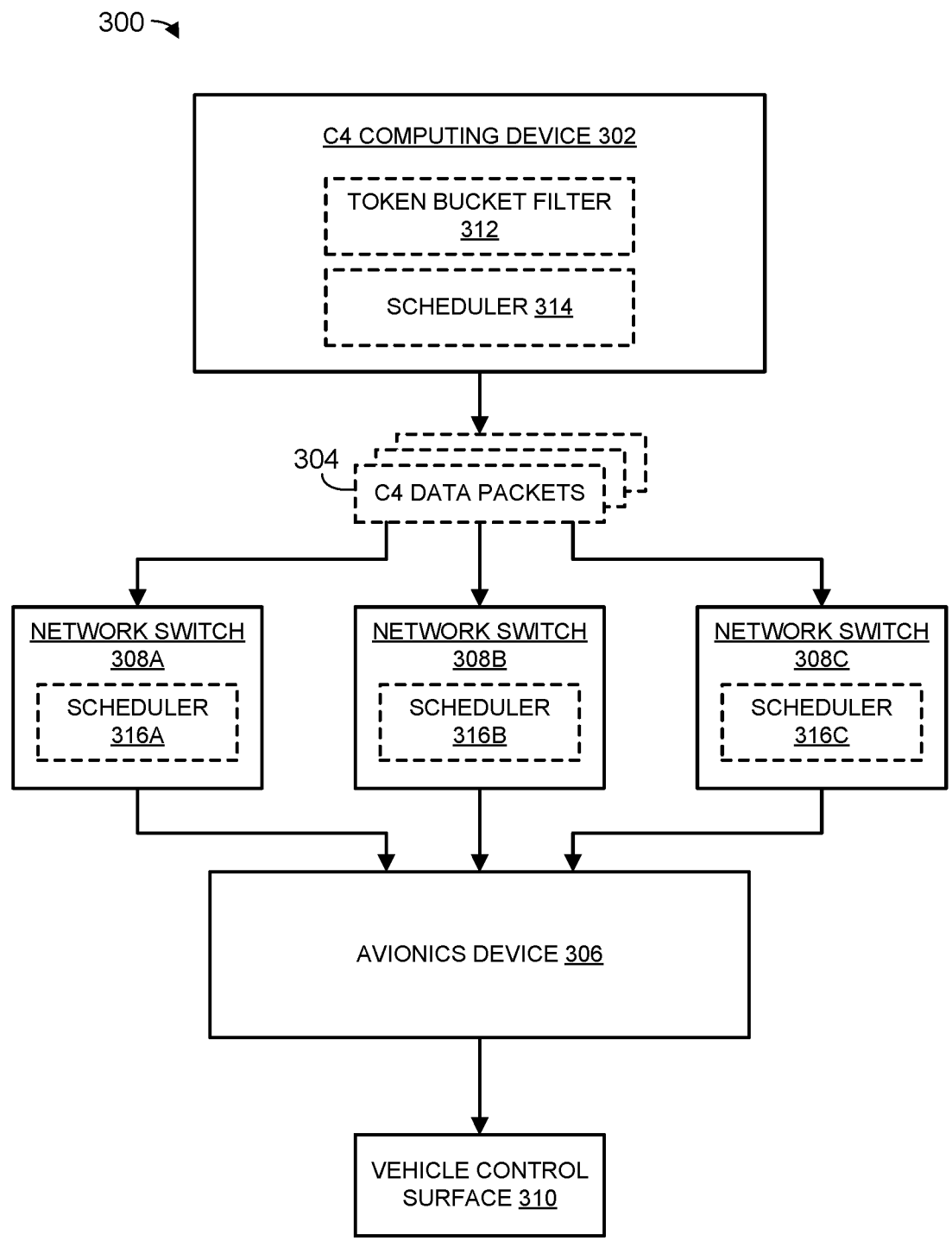
FIGS. 3A and 3B schematically illustrate transmission of data packets in an avionics data communication network.

FIG. 3A schematically shows another example data communication network 300, and will be used to describe software quality of service (QoS) components useable to satisfy a deterministic end-to-end transmission delay bound for data packets transmitted over the network. In this example, the data communication network is an avionics data communication network, used for transmitting command, control, communications, and computers (C4) data to an avionics device of an aerial vehicle. Specifically, network 300 includes a C4 computing device 102 that asynchronously transmits C4 data packets 304 to an avionics device 306.

For the sake of simplicity, FIG. 3A only shows one C4 computing device 302 and avionics device 306. However, as with FIG. 2, it will be understood that a data communication network as described herein can include any suitable number of network nodes, each configured to transmit data to and/or receive data from any suitable number of other network nodes. It will be understood that C4 computing device 302 is a non-limiting example of any computing device 202A-C described above with respect to FIG. 2, and thus has similar hardware capabilities—e.g., although not shown in FIG. 3A, C4 computing device 302 includes three redundant NICs for asynchronously transmitting data packets in parallel. Similarly, avionics device 306 is a non-limiting example of any destination device 204A-C described above with respect to FIG. 2.

In the example of FIG. 3A, C4 computing device 302 includes a TBF 312 to bound the data packets offered to the avionics data communication network. A TBF can be described using a "leaky bucket" metaphor, where a hypothetical bucket is gradually filled with tokens over time. Transmission of data packets to the communication network consumes tokens from the bucket, and if the bucket has insufficient tokens to transmit a particular packet, then the packet is dropped. This enforces a peak information rate for data transmission. If the bucket fills with tokens, then a burst of packets can be transmitted at once. In this manner, the bucket depth can be used to enforce a peak burst size for data transmission.

In other words, in some examples, the TBF implemented by the C4 computing device controls a peak information rate, peak burst size, committed information rate, and committed burst size of the data packets, and bounds the data packets offered to the avionics data communication network in the dimensions of packet rate and packet burst size. The TBF is implemented in any suitable way. As non-limiting examples, the TBF is one of a Single Rate Three Color Marker TBF, or a Two Rate Three Color Marker TBF.

As discussed above, the C4 data packets are received and relayed by three or more redundant network switches of the data communication network. In FIG. 3A, network 300 includes network switches 308A-308C. In this example, each of the computing device and the three or more redundant network switches are configured to regulate transmission of the data packets using prioritized fair share schedulers. Specifically, C4 computing device 302 implements a scheduler 314, while network switches 308A-308C respectively implement schedulers 316A-316C. As one non-limiting example, regulating the transmission of the data packets is done using packet-based generalized processor sharing (P-GPS), also referred to as weighted fair queueing (WFQ). As additional non-limiting examples, transmission scheduling can employ worst-cast WFQ (WF2Q), priority queueing WFQ (PQ-WFQ), modified deficit round robin (MDRR), elastic round robin (ERR), or priority ERR (PERR).

Use of both an ingress TBF and per-node fair scheduling beneficially provides bounded delay for all paths from the source device to the destination device through the avionics data communication network, obviating the need for synchronous transport. In some examples, a pulse-per-second (PPS) signal originating from one or more global positioning system (GPS) receivers is transmitted out-of-band to one or more network devices, which use the PPS signal to synchronize triple-voting applications and distribute the PPS to other hosts on the network. The worst-case delay for a particular packet can be calculated according to the following expression, where $D_i$ is the worst-case delay for flow i, $\sigma_i$ is the maximum number of tokens supported by the ingress TBF, k is the number of end-to-end network links traversed by a flow's traffic, $L_{max}$ is the maximum packet size supported by the network, pi is the fixed rate of the ingress leaky bucket, and $r_m$ is the data rate of the physical link for node m in the network:

$$D_i \leq \frac{(\sigma_i + (k-1)L_{max})}{\rho_i + \sum_i^k \left(\frac{L_{max}}{r_m}\right)}$$

In any case, the C4 data packets are relayed by the three or more redundant network switches and received at avionics device 306. As with the destination devices 204A-C described above with respect to FIG. 2, in some cases the avionics device receives the data packets in parallel from each of the three or more redundant network switches. In other examples, the avionics device only receives data packets from one network switch.

As discussed above, the data packets received at the avionics device take any suitable form and are used for any suitable purpose. In the example of FIG. 3A, the data packets are C4 data packets used to control a vehicle control surface 310 of an aerial vehicle, where non-limiting examples of control surfaces include flaps, ailerons, stabilizers, elevators, tabs, slats, etc. In other examples, the C4 data packets received by an avionics device are used for any other suitable purpose, in addition to or instead of controlling a vehicle control surface.

Figure 3B:
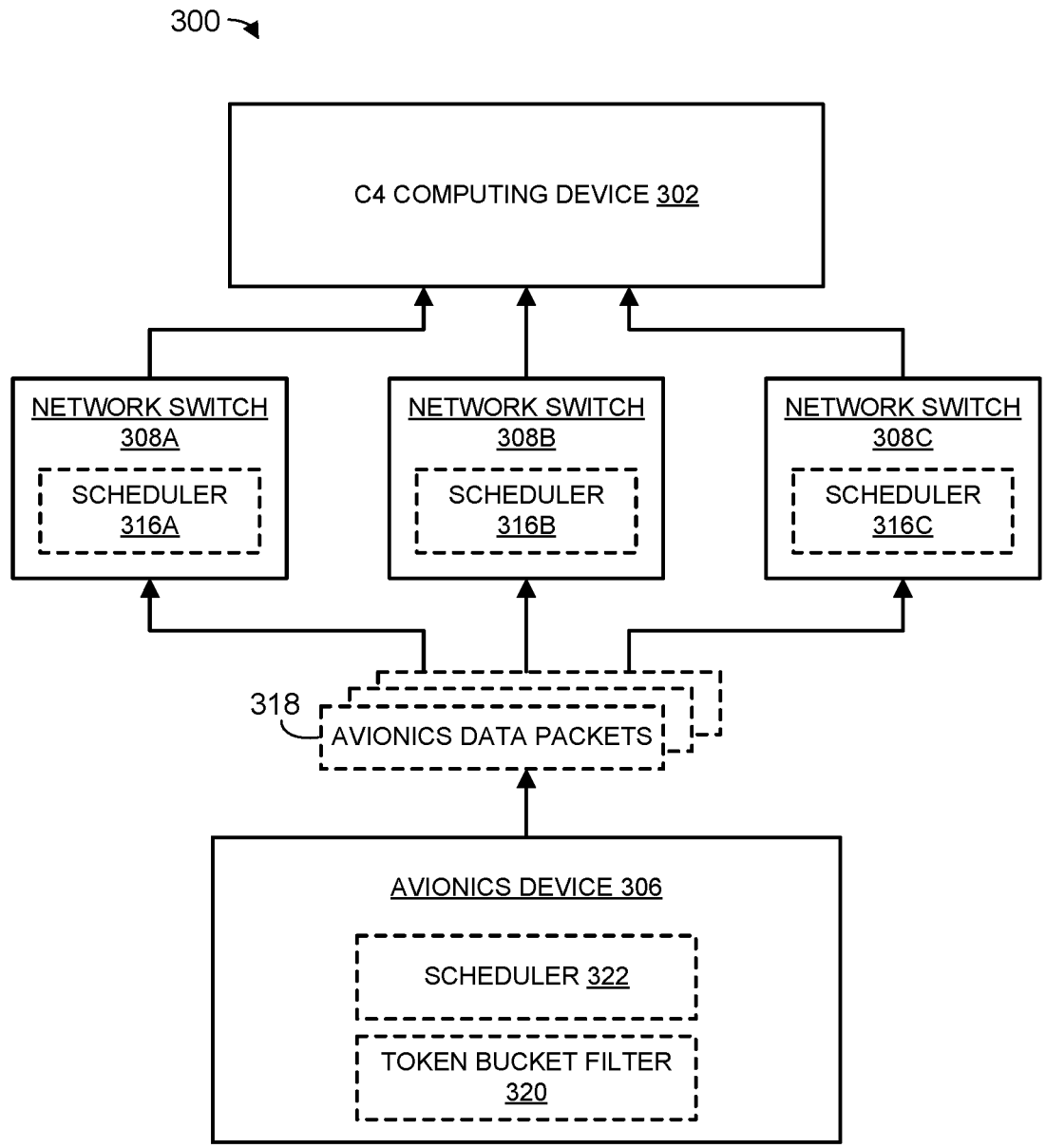

FIG. 3A focuses on data packets transmitted from the C4 computing device to the avionics device. As discussed above, however, the avionics itself device is in some cases configured to transmit data packets over the avionics data communication network. This is schematically illustrated with respect to FIG. 3B, in which avionics computing device 306 transmits a plurality of avionics data packets 318 to computing device 302, where the avionics data packets are relayed by at least one of the three or more redundant network switches. As shown in FIG. 3B, the avionics device is configured to implement a second TBF 320 to bound the avionics data packets being offered to the avionics data communication network. Similarly, the avionics device implements a respective scheduler 322, which works in tandem with schedulers 316A-C of the network switches to provide per-node fair scheduling.

As discussed above, an aerial vehicle (and/or other suitable platform) in some cases includes two or more different data communication networks, used for transmitting different types of data. For instance, in some cases two different communications networks having similar or identical physical configurations are used for two different types of data—e.g., one network is used for C4 data, while another network is used for ISR (intelligence, surveillance, and reconnaissance) data.

Figure 4:
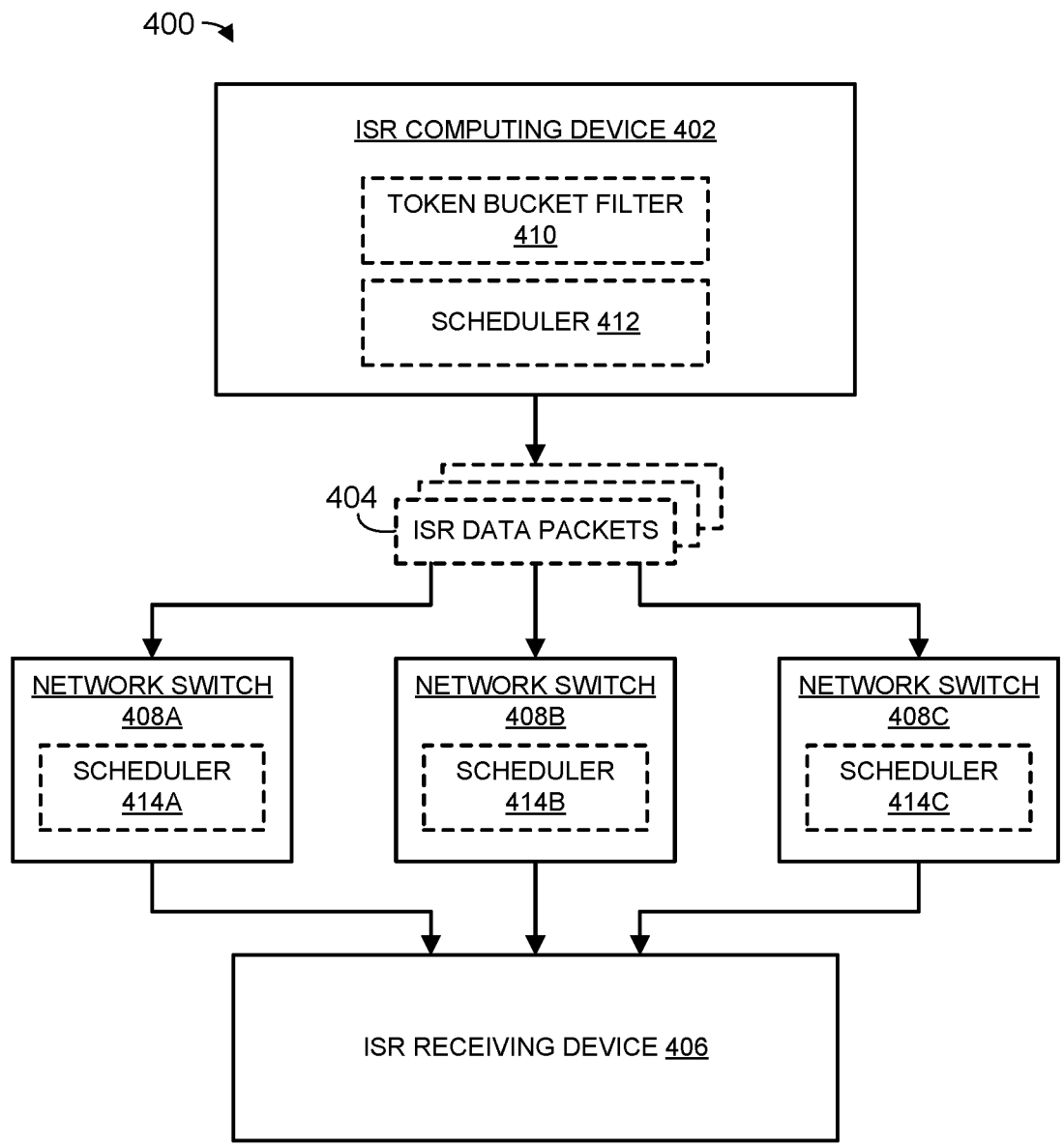
FIG. 4 schematically illustrates transmission of C4ISR (command, control, communications, computers, intelligence, surveillance, and reconnaissance) data packets in an ISR data communication network.

As such, FIG. 4 schematically illustrates an ISR data communication network 400, having a similar design to avionics data communication network 300 of FIGS. 3A and 3B. In some examples, ISR network 400 is implemented in the same aerial vehicle as avionics network 300, and the two networks are used simultaneously to transmit different types of data to on-board network devices.

Network 400 includes an ISR computing device 402 configured to asynchronously transmit ISR data packets 404 in parallel via a respective set of three or more redundant NICs. The ISR data packets are delivered to an ISR receiving device 406 after they are received and relayed by three or more redundant network switches 408A-408C. As with computing devices 202A-202C of FIG. 2, ISR computing device 402 has three or more redundant NICs. As such, the three or more redundant network switches 408A-408C are each configured to receive and relay the ISR data packets from a different NIC of the three or more redundant NICs of the ISR computing device.

In cases where the ISR data communication network is one of two or more different networks on the same platform, then the network switches 408A-408C are a second set of network switches. In some examples, the second set of network switches beneficially have a same hardware design as the first set of three or more redundant network switches (e.g., switches 308A-308C of network 300), which can simplify network configuration.

In FIG. 4, the ISR computing device implements a TBF 410, which is used to bound the ISR data packets offered to the ISR data communication network as described above. Similarly, the ISR computing device implements a scheduler 412, which works in tandem with schedulers 414A-414C implemented by network switches 408A-408C to provide per-node fair scheduling. In this manner, the ISR data packets are delivered to the ISR receiving device 406 within a deterministic end-to-end transmission delay bound. As with destination devices 204A-204C and avionics device 306 described above, the ISR receiving device in some cases receives the data packets in parallel from each of the three or more redundant network switches. In other examples, the ISR receiving device only receives data packets from one network switch.

In cases where the ISR data communication network is one of two or more different networks on the same platform, then the deterministic end-to-end transmission delay bound used for the ISR data packets need not be the same as the delay bound used for other data transmitted on other networks (e.g., avionics data). In other words, each data communication network optionally has a different transmission delay bound tailored to that network's particular purpose and requirements.

Furthermore, in some examples, the same data communication network supports multiple different deterministic end-to-end transmission delay bounds for different types of data. For example, in some scenarios, the source computing device transmits data packets with a selected class-of-service priority level of two or more different class-of-service priority levels. The data packets are then received at the destination device within a deterministic end-to-end transmission delay bound corresponding to the selected class-of-service priority level, wherein each of the two or more different class-of-service priority levels are associated with different deterministic end-to-end transmission delay bounds. As one example, the data communication network is used by customers of a service provider (e.g., an internet service provider), and the customer service provider offers different performance levels with different guaranteed transmission delay bounds.

In such scenarios, each node of the data communication network is configured to implement per-node fair scheduling, as discussed above. This can be implemented via per-port WFQ or per-flow WFQ, as non-limiting examples. In a per-port WFQ example, each WFQ scheduler receives data associated with eight different priority code point (PCP) class of service queues (or a different suitable number of PCP queues), and outputs on different egress ports. The guaranteed minimum rate for each PCP class of service queue can be calculated according to the following expression, where $R_i$ is the proportional rate for a particular class of service ($CoS_i$), $R_{Port}$ is the switch port rate, and $w_i$ is the weight for $CoS_i$.

$$R_i = R_{Port} * \left( w_i / \sum_{i=1}^{CoS=8} w_i \right)$$

The deterministic end-to-end transmission delay bound for a particular class of service can be calculated according to the following expression, where $D_i^{E2E}$ is the deterministic end-to-end transmission delay bound, NumHops is the total end-to-end hop count, $Prop_{Max}$ is the maximum data frame size $CoS_i$, $CBS_i$ is the committed burst size, $LEN_i$ is the maximum data frame size, and MTU is the maximum transmission rate:

$$D_i^{E2E} \leq$$
$$\left( \sum_{i=1}^{NumHops} Prop_{Max} \right) + \left( \left( \frac{CBS_i}{w_i} \right) + \left( \frac{(NumHops-1)LEN_i}{w_i} \right) + \left( \frac{MTU}{R_{Port}} \right) \right)$$

As discussed above, the techniques described herein can beneficially improve the resilience of the network to data transmission faults—e.g., caused by interaction between device logic and charged particles. To this end, a destination device (e.g., avionics device, ISR receiving device) that receives two or more data packets in parallel in some cases is configured to verify that the two or more data packets are identical. In other words, the destination device determines whether one of the data packets has been altered in transit (e.g., a single bit flip). In some cases, the two or more data packets received in parallel include three data packets received via three or more redundant network switches, as is illustrated with respect to FIGS. 2, 3A, 3B, and 4. Upon verifying that the two or more data packets are identical, the destination device in some cases passes a single data packet of the two or more data packets to a destination address.

Figure 5:
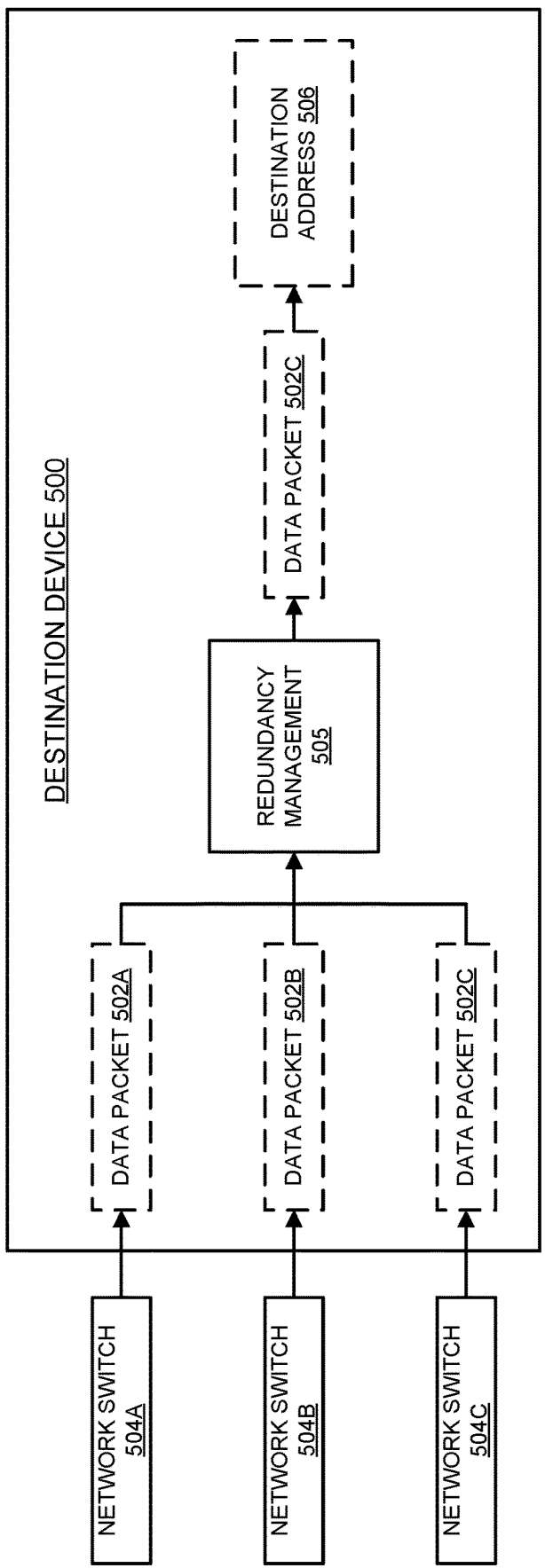
FIG. 5 schematically illustrates a destination device receiving data packets in parallel from redundant network switches.

This is schematically illustrated with respect to FIG. 5, showing an example destination device 500. In FIG. 5, the destination device receives three data packets 502A-502C in parallel via three redundant network switches 504A-504C. The destination device includes redundancy management logic 505, which first verifies whether all three data packets are identical. Upon determining that the data packets are identical, one single data packet (packet 502C in this example) is passed to a destination address 506 that consumes the data. Provided each of the data packets are identical, then any of the data packets can be selected for delivery to the destination address. As one non-limiting example, the destination device passes whichever data packet arrived first.

If the redundancy management logic determines that one data packet is not identical to the other data packets, then the non-conforming data packet in some examples is discarded. Receiving odd numbers of data packets in parallel (e.g., 3 data packets) beneficially ensures that, in cases where there are differences between the received data packets, majority voting can be used to determine which version of the received data is correct. For instance, if one data packet is altered in transit, it will be outnumbered by the other two data packets that remain identical to one another.

Figure 6:
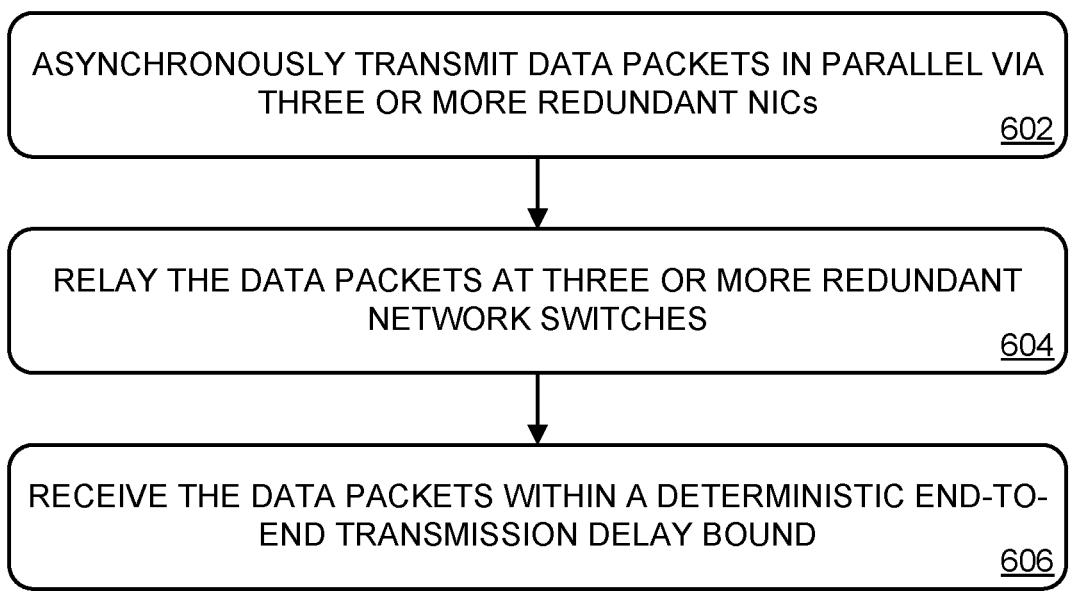
FIG. 6 illustrates an example method for data transmission in a data communication network.

FIG. 6 illustrates an example method 600 for asynchronous data transmission in a data communication network. Steps of method 600 may be performed by any suitable electronic device or devices of the data communication network. Each device performing steps of method 600 has any suitable capabilities, hardware configuration, and form factor. In some examples, any device performing steps of method 600 is implemented as computing system 700 described below with respect to FIG. 7.

At 602, method 600 includes asynchronously transmitting data packets in parallel via three or more redundant NICs of a computing device. This is done substantially as described above with respect to FIGS. 2, 3A, and 3B. In some examples, the computing device implements a TBF to bound the data packets transmitted to the data communication network—e.g., to control a peak information rate, peak burst rate, committed information rate, and committed burst rate, of the traffic offered to the network. Furthermore, transmitting each of several redundant data packets in parallel to different network planes provides high availability and improves the resilience of the network to transmission faults. For instance, as discussed above, the computing device in some cases implements PRP modified to support tri-cast transmission, and uses Gray codes to encode identifiers for each network plane to which data packets are transmitted.

At 604, method 600 includes relaying the data packets at three or more redundant network switches. In some cases, each node of the network (e.g., data source devices and network switches) is configured to implement per-node fair scheduling—e.g., using P-GPS. Use of a TBF to bound ingress network traffic, in tandem with per-node fair scheduling, beneficially enables the data communication network to satisfy a deterministic end-to-end transmission delay bound even when the data packets are transmitted asynchronously. As such, at 606, method 600 includes receiving the data packets at a destination device within the deterministic end-to-end transmission delay bound.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
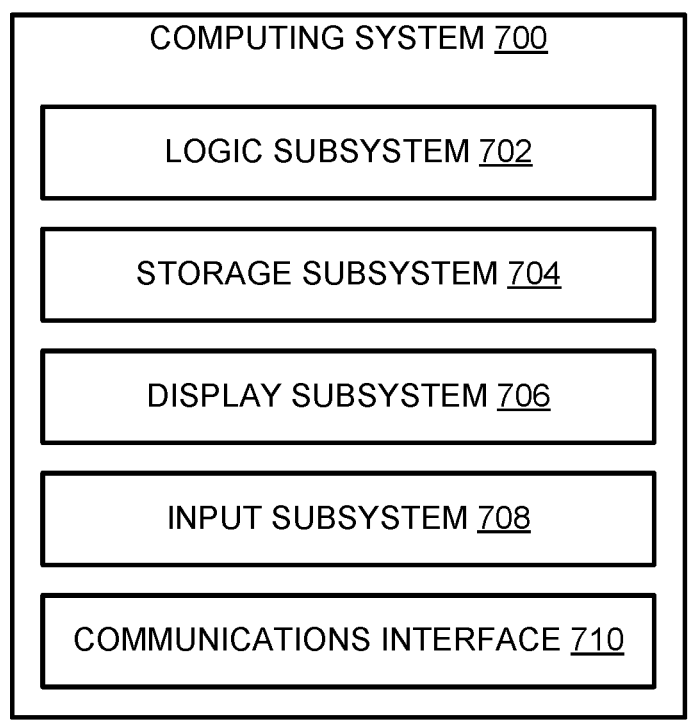
FIG. 7 schematically shows an example computing system.

FIG. 7 schematically shows a simplified representation of a computing system 700 configured to provide any to all of the compute functionality described herein. Computing system 700 may take the form of one or more network-accessible devices (e.g., avionics devices, C4 devices, ISR devices), personal computers, server computers, tablet computers, mobile computing devices, mobile communication devices (e.g., smart phone), Internet of Things (IoT) devices, embedded computing devices, and/or other computing devices.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, an avionics data communication network comprises: a computing device configured to: asynchronously transmit data packets in parallel via three or more redundant network interface controllers (NICs); and bound the data packets offered to the avionics data communication network using a token bucket filter (TBF); three or more redundant network switches, each configured to receive and relay the data packets from a different NIC of the three or more redundant NICs of the computing device; and an avionics device configured to receive the data packets from the computing device within a deterministic end-to-end transmission delay bound, the avionics device receiving the data packets via at least one of the three or more redundant network switches. In this example or any other example, the avionics device receives the data packets in parallel from each of the three or more redundant network switches. In this example or any other example, the avionics device is configured to, upon receiving two or more of the data packets in parallel, verify that the two or more data packets are identical. In this example or any other example, the avionics device is configured to, upon verifying that the two or more data packets are identical, pass a single data packet of the two or more data packets to a destination address. In this example or any other example, the two or more data packets received in parallel by the avionics device include three data packets received from the three or more redundant network switches. In this example or any other example, the avionics device includes a central processing unit (CPU). In this example or any other example, each of the computing device and the three or more redundant network switches are configured to regulate transmission of the data packets using prioritized fair share schedulers. In this example or any other example, the avionics device is configured to transmit a plurality of avionics data packets to the computing device, the plurality of avionics data packets relayed by each of the three or more redundant network switches. In this example or any other example, the avionics device is configured to implement a second TBF to bound the avionics data packets being offered to the avionics data communication network. In this example or any other example, the TBF controls a peak information rate, peak burst size, committed information rate, and committed burst size of the data packets, and bounds the data packets offered to the avionics data communication network in dimensions of packet rate and packet burst size. In this example or any other example, the TBF is one of a Single Rate Three Color Marker TBF or a Two Rate Three Color Marker TBF. In this example or any other example, the avionics device is configured to control one or more control surfaces of a vehicle. In this example or any other example, the vehicle is one of an aerial vehicle, an aquatic vehicle, or an extra-atmospheric vehicle. In this example or any other example, the vehicle is an unmanned vehicle. In this example or any other example, the computing device, the three or more redundant network switches, and the avionics device are communicatively coupled via asynchronous ethernet. In this example or any other example, the computing device is a C4 (command, control, communications, and computers) computing device, and the data packets are used to control one or more control surfaces of a vehicle.

In an example, an aerial vehicle comprises: a vehicle frame; a propulsion system; a C4 (command, control, communications, and computers) computing device configured to: asynchronously transmit C4 data packets in parallel via three or more redundant network interface controllers (NICs); and bound the C4 data packets offered to an avionics data communication network using a token bucket filter (TBF); a first set of three or more redundant network switches, each configured to receive and relay the C4 data packets from a different NIC of the three or more redundant NICs of the C4 computing device; and an avionics device configured to receive the C4 data packets from the C4 computing device within a first deterministic end-to-end transmission delay bound, the avionics device receiving the C4 data packets via at least one of the first set of three or more redundant network switches, the avionics device configured to control operation of a control surface of the aerial vehicle based at least in part on the C4 data packets and thereby influence movement of the aerial vehicle. In this example or any other example, the aerial vehicle further comprises: an ISR (intelligence, surveillance, and reconnaissance) computing device configured to: asynchronously transmit ISR data packets in parallel via a second set of three or more redundant NICs; and bound the ISR data packets offered to an ISR data communication network using a second TBF; a second set of three or more redundant network switches having a same hardware design as the first set of three or more redundant network switches, each of the second set of three or more redundant network switches configured to receive and relay the ISR data packets from a different NIC of the second set of three or more redundant NICs of the ISR computing device; and an ISR receiving device configured to receive the ISR data packets from the ISR computing device within a second deterministic end-to-end transmission delay bound, the ISR receiving device receiving the ISR data packets via at least one of the second set of three or more redundant network switches. In this example or any other example, the C4 computing device, the first set of three or more redundant network switches, and the avionics device are communicatively coupled via asynchronous ethernet.

In an example, a method for asynchronous data transmission in a data communication network comprises: at a computing device, asynchronously transmitting data packets with a selected class-of-service priority level of two or more different class-of-service priority levels, the data packets transmitted in parallel via three or more redundant network interface controllers (NICs) of the computing device, wherein the data packets offered to the data communication network are bound via a token bucket filter (TBF); receiving and relaying the data packets at three or more redundant network switches, each of the three or more redundant network switches receiving the data packets from a different NIC of the three or more redundant NICs of the computing device; and at a destination device, receiving the data packets from the computing device within a deterministic end-to-end transmission delay bound corresponding to the selected class-of-service priority level, wherein each of the two or more different class-of-service priority levels are associated with different deterministic end-to-end transmission delay bounds, the destination device receiving the data packets via at least one of the three or more redundant network switches.

The invention claimed is:

1. An avionics data communication network, comprising:
   a computing device configured to:
      asynchronously transmit data packets in parallel via three or more redundant network interface controllers (NICs); and
      bound the data packets offered to the avionics data communication network using a token bucket filter (TBF);
   three or more redundant network switches, each configured to receive and relay the data packets from a different NIC of the three or more redundant NICs of the computing device, wherein each of the computing device and the three or more redundant network switches implement prioritized fair share schedulers to regulate transmission of the data packets; and
   an avionics device configured to receive the data packets from the computing device within a deterministic end-to-end transmission delay bound, the avionics device receiving the data packets via at least one of the three or more redundant network switches.

2. The avionics data communication network of claim 1, wherein the avionics device receives the data packets in parallel from each of the three or more redundant network switches.

3. The avionics data communication network of claim 2, wherein the avionics device is configured to, upon receiving two or more of the data packets in parallel, verify that the two or more data packets are identical.

4. The avionics data communication network of claim 3, wherein the avionics device is configured to, upon verifying that the two or more data packets are identical, pass a single data packet of the two or more data packets to a destination address.

5. The avionics data communication network of claim 3, wherein the two or more data packets received in parallel by the avionics device include three data packets received from the three or more redundant network switches.

6. The avionics data communication network of claim 2, wherein the avionics device includes a central processing unit (CPU).

7. The avionics data communication network of claim 1, wherein the avionics device is configured to transmit a plurality of avionics data packets to the computing device, the plurality of avionics data packets relayed by each of the three or more redundant network switches.

8. The avionics data communication network of claim 7, wherein the avionics device is configured to implement a second TBF to bound the avionics data packets being offered to the avionics data communication network.

9. The avionics data communication network of claim 1, wherein the TBF controls a peak information rate, peak burst size, committed information rate, and committed burst size of the data packets, and bounds the data packets offered to the avionics data communication network in dimensions of packet rate and packet burst size.

10. The avionics data communication network of claim 1, wherein the TBF is one of a Single Rate Three Color Marker TBF or a Two Rate Three Color Marker TBF.

11. The avionics data communication network of claim 1, wherein the avionics device is configured to control one or more control surfaces of a vehicle.

12. The avionics data communication network of claim 11, wherein the vehicle is one of an aerial vehicle, an aquatic vehicle, or an extra-atmospheric vehicle.

13. The avionics data communication network of claim 11, wherein the vehicle is an unmanned vehicle.

14. The avionics data communication network of claim 1, wherein the computing device, the three or more redundant network switches, and the avionics device are communicatively coupled via asynchronous ethernet.

15. The avionics data communication network of claim 1, wherein the computing device is a C4 (command, control, communications, and computers) computing device, and the data packets are used to control one or more control surfaces of a vehicle.

16. An aerial vehicle, comprising:
a vehicle frame;
a propulsion system;
a C4 (command, control, communications, and computers) computing device configured to:
asynchronously transmit C4 data packets in parallel via three or more redundant network interface controllers (NICs); and
bound the C4 data packets offered to an avionics data communication network using a token bucket filter (TBF);
a first set of three or more redundant network switches, each configured to receive and relay the C4 data packets from a different NIC of the three or more redundant NICs of the C4 computing device, wherein each of the C4 computing device and the first set of three or more redundant network switches implement prioritized fair share schedulers to regulate transmission of the C4 data packets; and
an avionics device configured to receive the C4 data packets from the C4 computing device within a first deterministic end-to-end transmission delay bound, the avionics device receiving the C4 data packets via at least one of the first set of three or more redundant network switches, the avionics device configured to control operation of a control surface of the aerial vehicle based at least in part on the C4 data packets and thereby influence movement of the aerial vehicle.

17. The aerial vehicle of claim 16, further comprising:
an ISR (intelligence, surveillance, and reconnaissance) computing device configured to:
asynchronously transmit ISR data packets in parallel via a second set of three or more redundant NICs; and
bound the ISR data packets offered to an ISR data communication network using a second TBF;
a second set of three or more redundant network switches having a same hardware design as the first set of three or more redundant network switches, each of the second set of three or more redundant network switches configured to receive and relay the ISR data packets from a different NIC of the second set of three or more redundant NICs of the ISR computing device; and
an ISR receiving device configured to receive the ISR data packets from the ISR computing device within a second deterministic end-to-end transmission delay bound, the ISR receiving device receiving the ISR data packets via at least one of the second set of three or more redundant network switches.

18. The aerial vehicle of claim 13, wherein the C4 computing device, the first set of three or more redundant network switches, and the avionics device are communicatively coupled via asynchronous ethernet.

19. A method for asynchronous data transmission in a data communication network, the method comprising:
at a computing device, asynchronously transmitting data packets with a selected class-of-service priority level of two or more different class-of-service priority levels, the data packets transmitted in parallel via three or more redundant network interface controllers (NICs) of the computing device, wherein the data packets offered to the data communication network are bound via a token bucket filter (TBF);
receiving and relaying the data packets at three or more redundant network switches, each of the three or more redundant network switches receiving the data packets from a different NIC of the three or more redundant NICs of the computing device, wherein each of the computing device and the three or more redundant network switches implement prioritized fair share schedulers to regulate transmission of the data packets; and
at a destination device, receiving the data packets from the computing device within a deterministic end-to-end transmission delay bound corresponding to the selected class-of-service priority level, wherein each of the two or more different class-of-service priority levels are associated with different deterministic end-to-end transmission delay bounds, the destination device receiving the data packets via at least one of the three or more redundant network switches.

20. The method of claim 19, wherein the destination device receives the data packets in parallel from each of the three or more redundant network switches.

* * * * *